United States Patent [19]

Anstey

[11] Patent Number: 4,581,879
[45] Date of Patent: Apr. 15, 1986

[54] ANTI-WRAP ATTACHMENT FOR ROLLS OF BALING MACHINE

[75] Inventor: Henry D. Anstey, Ottumwa, Iowa

[73] Assignee: Deere & Company, Moline, Ill.

[21] Appl. No.: 701,587

[22] Filed: Feb. 13, 1985

[30] Foreign Application Priority Data

Feb. 15, 1984 [EP] European Pat. Off. ........ 84101555.5

[51] Int. Cl.⁴ ............................................. A01D 39/00
[52] U.S. Cl. .......................................... 56/341; 56/1; 100/88
[58] Field of Search .................. 56/341, 1; 100/88, 89

[56] References Cited

U.S. PATENT DOCUMENTS

| | | | |
|---|---|---|---|
| 4,155,298 | 5/1979 | Gaeddert et al. | 56/341 |
| 4,228,638 | 10/1980 | Rabe et al. | 56/341 |
| 4,426,926 | 1/1984 | Soteropulos et al. | 56/341 |
| 4,428,282 | 1/1984 | Anstey | 100/88 |
| 4,436,027 | 3/1984 | Freimuth et al. | 56/341 |

Primary Examiner—Robert P. Swiatek
Assistant Examiner—David L. Tarnoff

[57] ABSTRACT

A baling machine, towed by a tractor, for forming large cylindrical bales of hay has a baling chamber defined by oppositely moving runs of belts trained over rolls.

In order to avoid stray hay wrapping around the ends of a roll and then being ingested in bearings supporting the ends of the roll, an anti-wrap assembly is provided at each end of the roll. The assemblies each comprise a spiral which is welded to the roll and which moves the stray crop away from the end of the roll, and a scraper mounted so as to have an edge thereof located very close to or in light contact with the spiral for preventing the crop from being carried around the roll by the spiral.

13 Claims, 6 Drawing Figures

ANTI-WRAP ATTACHMENT FOR ROLLS OF BALING MACHINE

BACKGROUND OF THE INVENTION

This invention relates to a machine for harvesting crop material having rotatable rolls which can contact the crop material, e.g. to a baling machine, for forming cylindrical bales of crop material, having a main frame, rotatable transverse rolls mounted thereon and belts trained over the rolls to provide a baling chamber for the crop material. And more specifically, this invention relates to devices for preventing material from wrapping about such rotatable rolls.

Machines, towed by a tractor, for forming large cylindrical bales of hay (so called "round" balers) are well-known. As the machine advances, the crop is removed from a windrow by a pickup mechanism and delivered rearwardly to a baling chamber where it is rolled into a bale between sets of oppositely moving belts, the growing bale rotating about a horizontal axis and the baling chamber expanding with the bale. The belts are trained over rolls which extend laterally of the machine and most of which are journalled at either end in the sides of the machine.

During baling, stray crop can become entrapped in the region between the sides of the baler, the outermost belts and the rolls, whereupon the crop tends to wrap around the roll ends which can be detrimental to belt tracking on the rolls. The crop can also find its way into the bearings of the rolls and foul them.

In our co-pending European patent application No. 82106409 we have described and claimed a baling machine which is designed to obviate the wrapping of crop along the length of a roll. In one arrangement described, an additional roll is provided over which the belts are alternately trained to give a staggered array with openings between the belts enabling stray crop to escape.

The present invention reduces the problem of crop wrapping around rolls and is particularly useful when used to protect the ends of the rolls. It can be employed in conjunction with the invention of EP No. 82106409 or independently.

SUMMARY OF THE INVENTION

According to the present invention there is provided a novel anit-wrap assembly for reducing the problem of crop materials wrapping about crop-engaging rolls at certain critical sites along the rolls, for example, locations adjacent bearings supporting opposite ends of the rolls.

An object of the invention is to provide an anti-wrap assembly having the ability to move crop materials along a roll away from sites where wrapping is likely while at the same time impeding the tendency of the crop to wrap about the roll.

A more specific object is to provide an anti-wrap assembly including sections of spiral flighting respectively secured to opposite end portions of a roll for moving crop material toward the middle of the roll and a scraper disposed adjacent each section of flighting for stripping crop from the flighted portion of the roll.

Another object of the invention is to provide an anti-wrap assembly including an elongate member rigid with a roll and extending along it and to provide a scraper having an edge in contact with the member or closely spaced therefrom whereby an accurate spatial relationship may be easily achieved by machining the elongate member.

Yet another object is to provide an anti-wrapping assembly which may be easily incorporated for use in existing machines.

These and other objects, features and advantages of the present invention will become apparent to those skilled in the art from the description which follows and from the drawings.

DESCRIPTION OF THE PREFERRED EMBODIMENT

Figure 1:
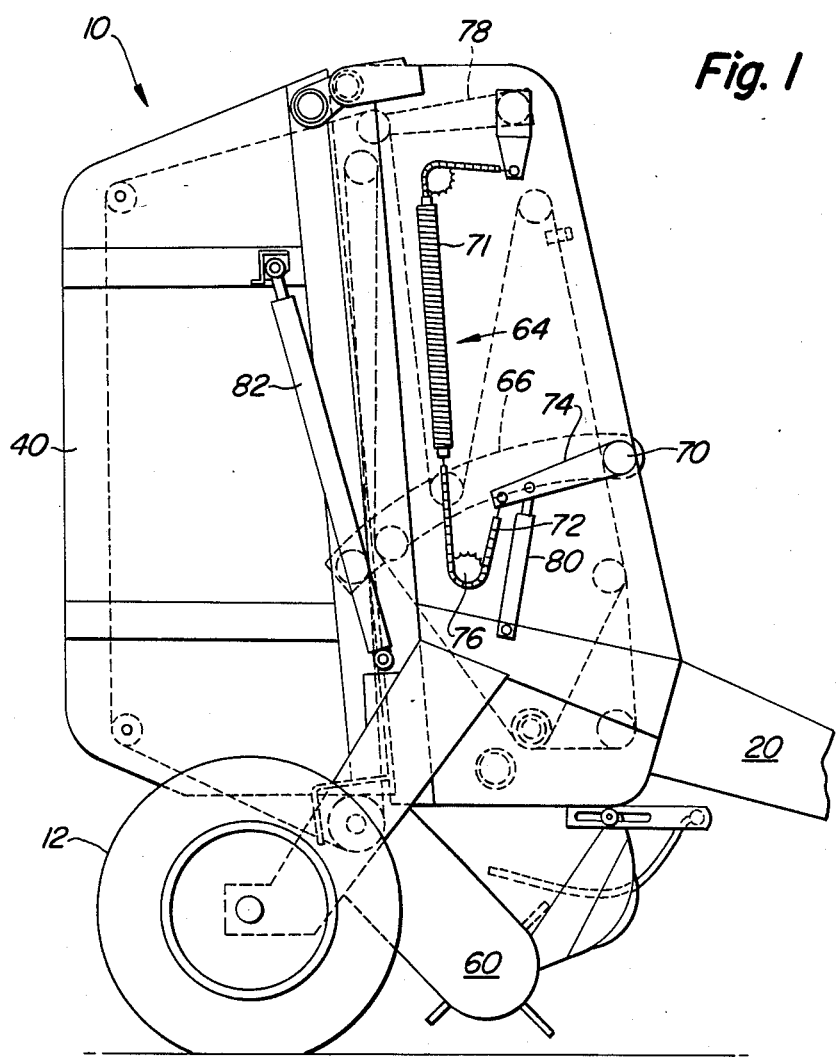
FIG. 1 is an elevational view of the right-hand side (considered when facing the direction of advancement) of a baling machine for forming large cylindrical bales of crop material showing in broken lines the disposition of the transverse rolls and belts trained around the rolls within the machine.

In the drawings (and particularly in FIGS. 1 and 2), the machine includes a main frame 10 mounted on a pair of wheels 12, 14. The main frame 10 has a pair of upright, opposite, fore-and-aft extending right and left sidewalls 16, 18 connected by transverse beams (not shown). A draft tongue 20 is connected to a cross beam at the front of the frame 10 and extends forwardly for attaching the baler to a tractor (also not shown) which draws the machine.

Figure 2:
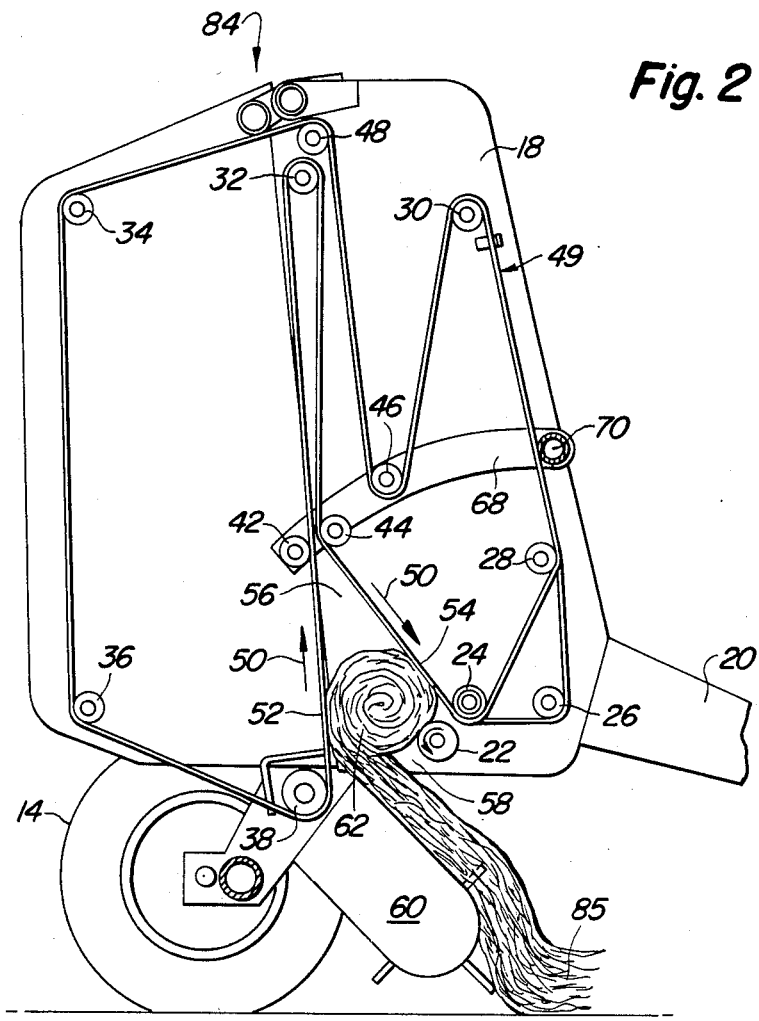
FIG. 2 is an elevational view similar to FIG. 1, but with the right-hand side of the machine removed.

A plurality of lateral rolls, shown in broken lines in FIG. 1 and in full lines in FIG. 2, extends over the width of the machine. One set of rolls 22, 24, 26, 28, 30, 32 is journalled in a forward fixed portion of the sidewalls, while a further set constituted by rolls 34, 36, 38 is journalled in a rearward swingable gate portion 40 of the sidewalls. There is also a pair of chamber restricting rolls 42, 44, and take-up and tensioning rolls 46, 48.

Six rubber belts 49 are trained side-by-side over the rolls, with the exception of the roll 22 which acts as a stripper roll, to provide the configuration shown in FIGS. 1 and 2. The belts 44 move in the direction indicated by arrows 50 while the stripper roll 22 is being driven anti-clockwise as viewed in FIGS. 1 and 2. Alternate belts only are trained over the lower foremost roll 26, while the remaining belts by-pass the roll 26 and run directly between the roll 24, which is at the same horizontal level as the roll 26, and the roll 28 which is approximately vertically above the roll 26. This creates, as explained and claimed in our aforesaid European patent application No. 82106409, a staggered array of belts affording the release of stray crop through gaps, formed as a result of the staggering, between neighboring belts. Upwardly extending runs 52, 54 of the belts provide with the sidewalls a bale-forming chamber 56 which has an inlet 58 for crop received from a pickup 60 beneath it.

In order to accommodate the increasing diameter of a growing bale core 62 in the bale-forming chamber 56, the size of the chamber must also increase and a belt take-up and tensioning mechanism 64 is provided for this purpose at either side of the machine. These mechanisms include: a pair of arms 66, 68 which are mounted on a horizontal transverse pivot shaft 70 at the forward end of the main frame 10; the take-up and tensioning roll 46 which is supported at either end at an intermediate location on the arms 66, 68; and the pair of chamber restricting rolls 42, 44 supported at the free end of the arms. The arms are biased in an anti-clockwise direction by a pair of springs one on either side of the main frame 10 of which only the right-hand spring 71 is shown and only its arrangement will be described, the other being similar. The spring 71 acts through a chain 72, at its lower end, on a bias arm 74 connected rigidly to the pivot shaft 70, the chain 72 being trained over a sprocket 76. At its upper end a further chain similarly connects the spring 71 to one end of a bell crank 78, and the other end of the bell crank bears one end of the take-up and tensioning roll 48. The bias arm 74 is also restrained by a piston and cylinder unit 80 pivotally connected at one end to the free end of the bias arm 74 and at the other to the associated right-hand sidewall 16 of the main frame 10. A similar arrangement is provided on the left-hand side of the machine so that, for example, the roll 48 is carried by bell cranks on either side.

The rear gate portion 40 is movable by a pair of upwardly extending hydraulic piston and cylinder units on either side of the main frame 10 of which only a right-hand unit 82 is shown. The unit 82 is pivotally connected at its lower end to the forward fixed portion of the sidewall 16 and at its upper end to the gate portion 40 which is swingable upwardly and downwardly about a pivot arrangement 84 at its upper forward region.

In operation, crop lying in a windrow 85 is lifted and conveyed to the baling chamber 56 where the oppositely moving runs 52, 54 of the belts, aided by the stripper roll 22, cause the crop to turn clockwise (as viewed in FIGS. 1 and 2) to form the bale cover 62 which increases in size and eventually overcomes the tension in the belts brought about by the tensioning mechanisms. The arms 66, 68 consequently swing upwardly and thus the chamber 56 increases in size as necessary to accommodate the bale core 62 as its diameter grows.

During baling, crop sometimes finds its way past the edges of the belts of the runs 52, 54 to the exterior of the bale chamber 56. Much stray crop forward of the baling chamber tends to escape due to the staggered array of belts as mentioned above, but some crop can nevertheless sometimes wrap around the roll 26 at its ends where it can be ingested into bearings of the roll or cause problems in belt tracking. The difficulties are exacerbated if the crop is wet.

Figure 3:
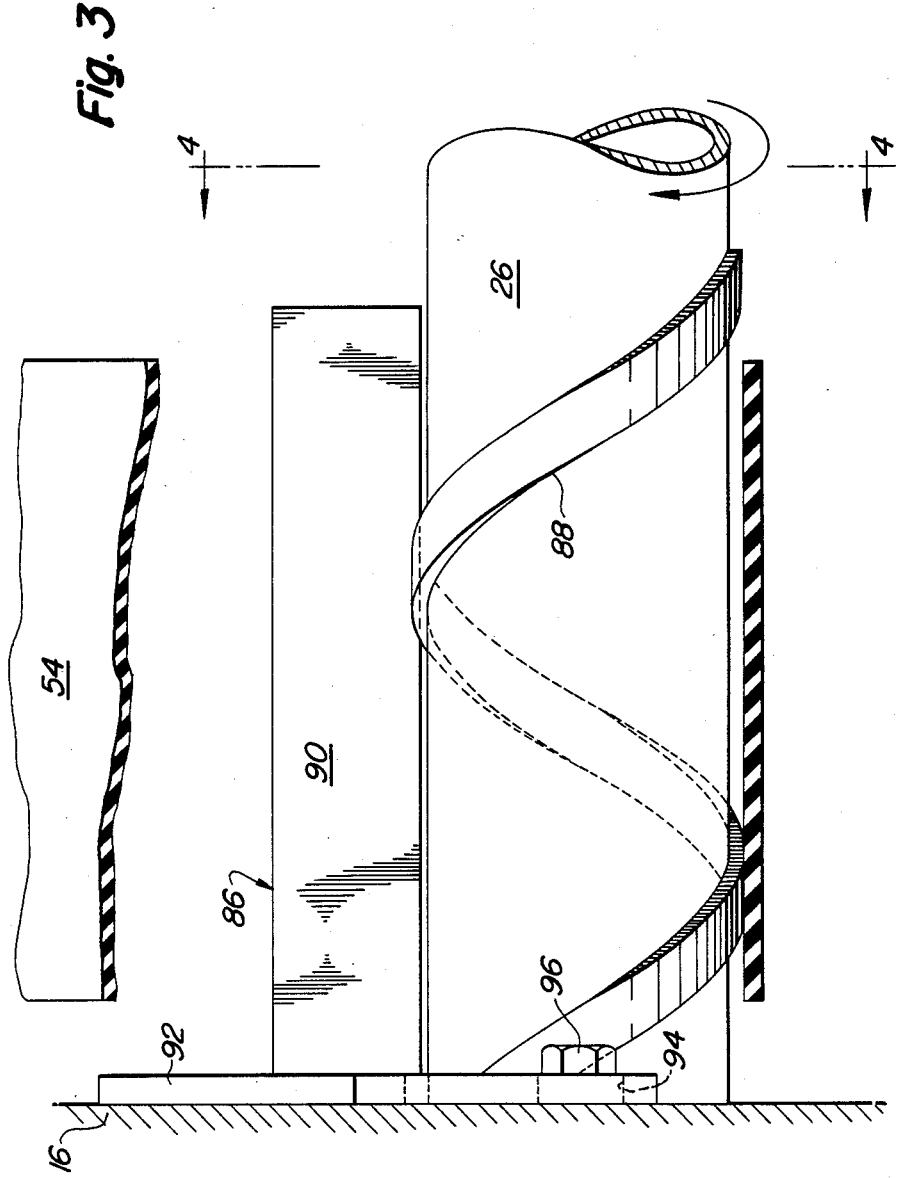
FIG. 3 is an elevational view, looking from the front to the rear, of the right-hand end of the lower foremost roll in FIG. 1 and associated anti-wrap assembly, with a portion of an end belt cut away to reveal the assembly and with its neighboring belt omitted.
Figure 4:
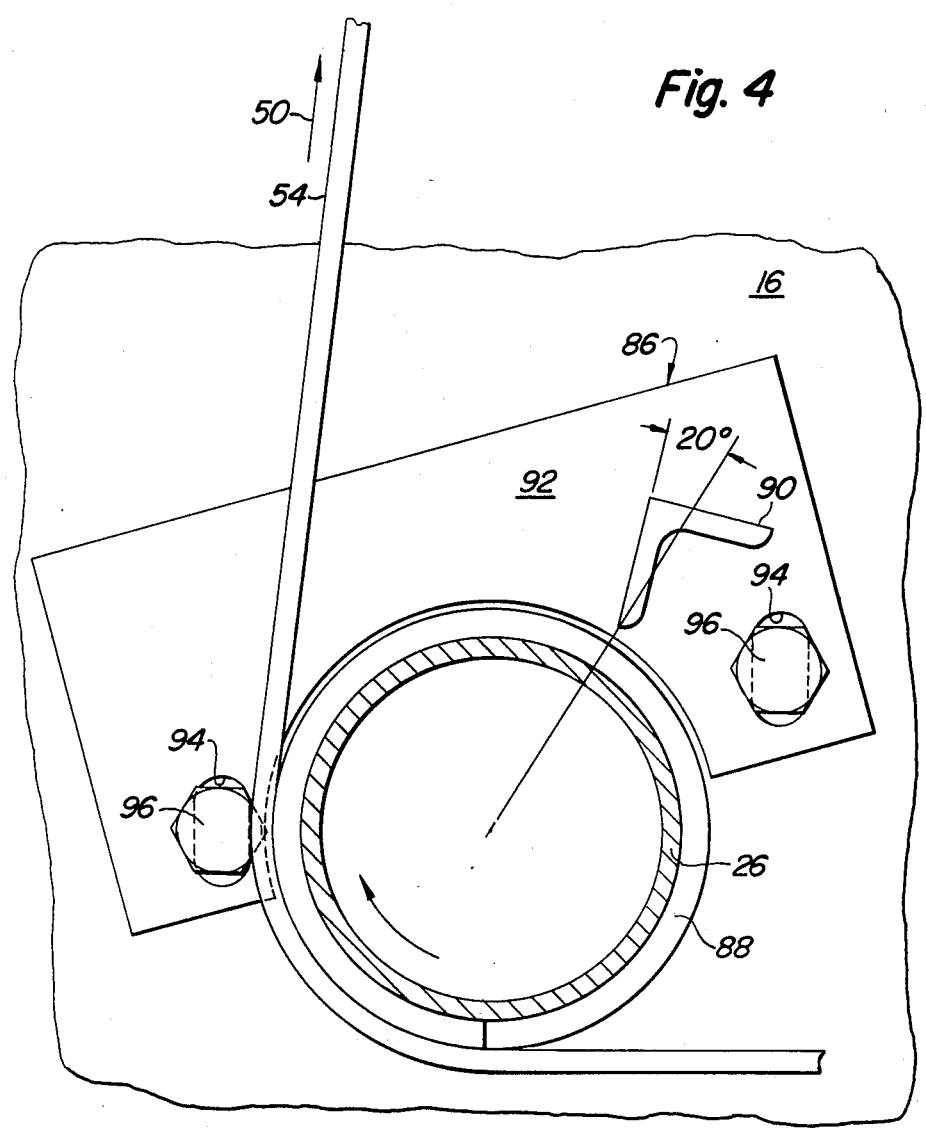
FIG. 4 is a cross section taken on the line 4—4 of FIG. 3.

In order to reduce wrapping of crop at the ends of the roll 26 an anti-wrap assembly 86 is provided at the right-hand end of the roll 26, as shown in FIGS. 3 and 4, and a corresponding assembly is located at the other end. The assembly 86 comprises a spiral 88, a scraper 90, and a mounting plate 92 for the scraper. The mounting plate 92 is rectangular and is provided with a semi-circular bite taken from its lower side to accommodate the cylindrical surface of the roll 26 so that the plate straddles the roll, and with a pair of adjustment slots 94 for receiving the shanks of two bolts 96. The scrape 90 is welded to the plate 92 and extends at right angles therefrom. The scraper 90 is V-shaped in cross section, one arm of the "V" extending from a region beyond the zenith of the semi-circular bite at a leading acute angle (of twenty degrees) from an extrapolated geometric radius line, and the remaining arm of the "V" being at right angles to the first and running in the trailing direction. Thus, the "V" opens in the trailing direction with respect to roll movement. The scraper 90 is mounted by way of the plate 92 which is secured by the bolts 96 to the inside face of the right sidewall 16 with the scraper 90 extending horizontally over the upper surface of the right-hand end portion of the roll 26. The spiral 88 is preferably formed from a rectangular cross section strap which is 5 mm in height and 20 mm in width. While not as effective as the strap, the spiral may be formed from a circular cross section rod, shown at 88' in FIGS. 5 and 6. The spiral 88 is welded to the end portion of the roll 26, its hand being such as to convey crop inwardly on rotation of the roll in the anti-clockwise direction as viewed in FIG. 1 (i.e., the spiral is right-handed). The mounting plate 92 is adjusted via the slots 94 to bring the scraper 90 into light contact, or just out of contact, with the spiral 88. The belt run 52 is trained over the spiral 88 which extends somewhat beyond the inner edge of the belt to the outer edge region of the neighboring belt (not shown).

Figure 5:
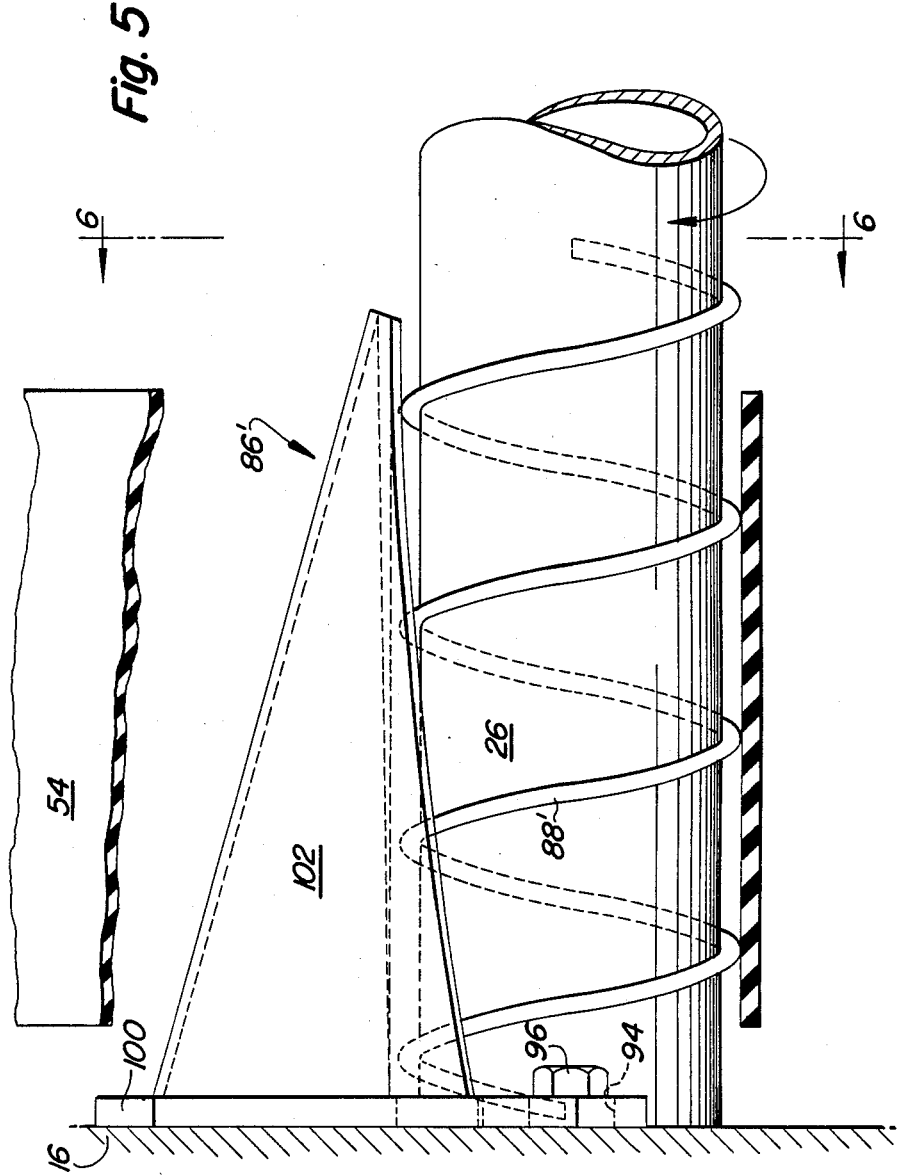
FIG. 5 is an elevational view similar to FIG. 3, but with a different scraper assembly.
Figure 6:
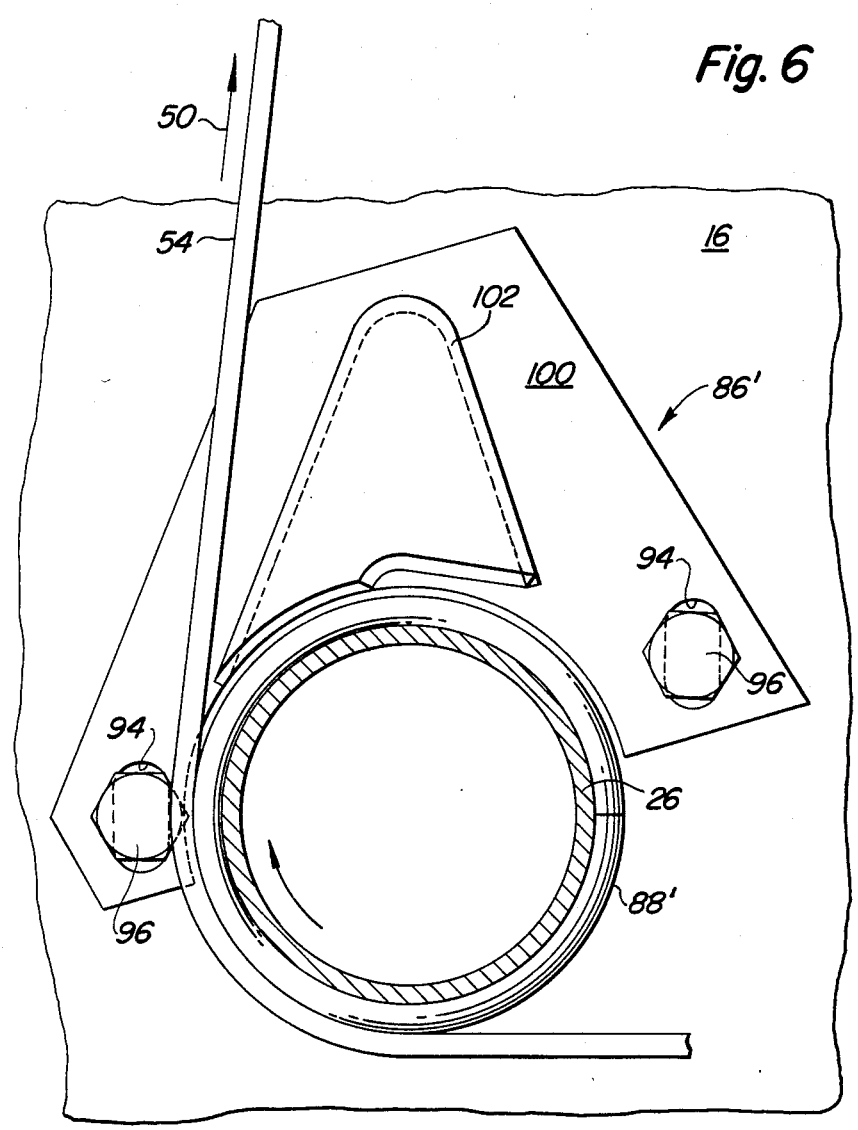
FIG. 6 is a cross section similar to that of FIG. 4, but taken on line 4—4 of FIG. 5.

Turning now to the anti-wrap assembly in FIGS. 5 and 6, here parts corresponding to those in FIGS. 3 and 4 have similar reference numerals. Here, an anti-wrap assembly 86' includes a mounting plate 100, which in this case, is approximately in the form of a trapezium instead of a rectangle. A scraper 102 also differs from that in FIGS. 3 and 4 in that it has a more complex shape, being roughly triangular in cross section with the base of the triangle initially closely following at its leading end the contour of the roll 26 and spiral 88' and thereafter at its trailing end being well spaced from the roll as can be seen in FIG. 6. The apex of the triangle is rounded. In its lengthwise direction the scraper 102 tapers inwardly of the machine as shown in FIG. 5.

As indicated above the anti-wrap assemblies 86 or 86' at the left-hand end of the roll 26 corresponds with that in FIGS. 3 and 4 or in FIGS. 5 and 6. The spiral is, of course, of opposite hand (i.e., left) to that on the right-hand end of the roll.

The anti-wrap assemblies each operate by conveying any stray crop tending to wrap around the end portion of the roll 26 away from the end. Specifically, the spirals 88 and 88' serve to convey the crop and the scrapers 90 and 102 to prevent crop from being carried around by the spiral. At the exit end of the spiral the crop is free to fall through the gap between neighboring belts.

It is also to be noted that crop carried upwardly by the belt 54 will, in the FIGS. 3 and 4 embodiment, be deposited on the roll 26 and spiral 88 where it is carried to the scraper 90 while such crop in the FIGS. 5 and 6 embodiment will be deposited on the scraper 102 and will slide down the scraper.

Although the embodiments of the invention have been described in respect of being located at the end regions of the roll 26, they can alternatively or in addition be provided for other rolls wherever wrapping is likely and where the unwanted stray crop can be moved away from the site of wrapping.

It is important that the scrapers 90 or 102 be accurately adjusted so that there is a constant spatial relationship over the length of the spiral member 88 or 88', between the adjacent edge of the scraper and the spiral member. This accuracy is accomplished by machining the spiral members 88 or 88', a task which can be done more simply and accurately than the alternative of machining the roll.

I claim:

1. A baling machine for forming cylindrical bales of crop material having: a main frame, rotatable transverse rolls mounted thereon and belts trained over the rolls to provide a baling chamber for the crop material characterized in that at least one of said rolls has opposite ends thereof supported in bearings and that a pair of anti-wrap assemblies is respectively mounted at both end regions of said one roll in the vicinity of the bearings therefor; each anti-wrap assembly comprising a first means extending lengthwise of and fixed to said at least one roll for moving crop therealong in a direction away from an adjacent one of the bearings; and a second means mounted in at least closely spaced relationship to the first means for preventing the crop being carried around the roll.

2. A baling machine according to claim 1 characterized in that therefor; said first means of each anti-wrap assembly is a respective spiral, with the spirals of said pair of anti-wrap assemblies being of opposite hands to move crop inwardly away from the bearings.

3. A baling machine according to claim 2 characterized in that said second means is a scraper of V-shaped cross section.

4. A baling machine according to claim 3 characterized in that the "V" opens in the trailing direction with respect to the rotation of said one roll with an arm of the "V" being at least closely spaced from the spiral and making a leading acute angle with an extrapolated geometric radius line of the roll.

5. A baling machine according to claim 4 characterized in that the arms of the "V" are substantially at right angles one to the other.

6. A baling machine according to claim 4 characterized in that the said acute angle is twenty degrees.

7. A baling machine according to claim 1 characterized in that said second means is a scraper which is approximately triangular in cross section and is arranged with its apex upwardly.

8. A baling machine according to claim 7 characterized in that the apex of the scraper in its lengthwise direction inclines downwardly toward said one roll in a direction inwardly of the machine.

9. A baling machine according to claim 8 characterized in that said first means of each anti-wrap assembly is a spiral and a leading portion of the base of the triangle is at least closely spaced from the spiral and a trailing portion thereof is well spaced from the spiral.

10. A baling machine according to claim 1 characterized in that said second means is a scraper rigidly attached to a mounting plate at right angles thereto; said mounting plate being attached to said main frame and straddling the roll.

11. A baling machine according to claim 10 characterized in that said mounting plate is attached to said main frame by bolts and has slots receiving the bolts, the slots allowing adjustment of the plate relative to the frame.

12. A baling machine according to claim 3 wherein said scraper is located on the opposite side of a zenith of said one roll from a belt engaged with the roll; and said edge being straight and paralleling a rotational axis of said roll.

13. A machine for harvesting crop material having rotatable rolls which can contact the crop material characterized in that at least one of said rolls is provided with an anti-wrap assembly comprising a spiral fixed to the roll for moving crop therealong; and a scraper mounted in at least closely spaced relationship to the spiral for preventing the crop from being carried around the roll.

* * * * *

UNITED STATES PATENT AND TRADEMARK OFFICE
CERTIFICATE OF CORRECTION

PATENT NO. :    4,581,879
DATED       :    15 April 1986
INVENTOR(S) :   Henry Dennis Anstey It is certified that error appears in the above-identified patent and that said Letters Patent is hereby corrected as shown below:

Col. 5, line 23, delete "therefor;" and line 24, delete "respective" and after "the", insert -- respective --.

Signed and Sealed this

Twenty-fifth Day of November, 1986

*Attest:*

DONALD J. QUIGG

*Attesting Officer*   *Commissioner of Patents and Trademarks*